July 20, 1943.   A. DE RENTIIS   2,324,497
FORCE MEASURING DEVICE
Filed Aug. 8, 1941   3 Sheets-Sheet 1
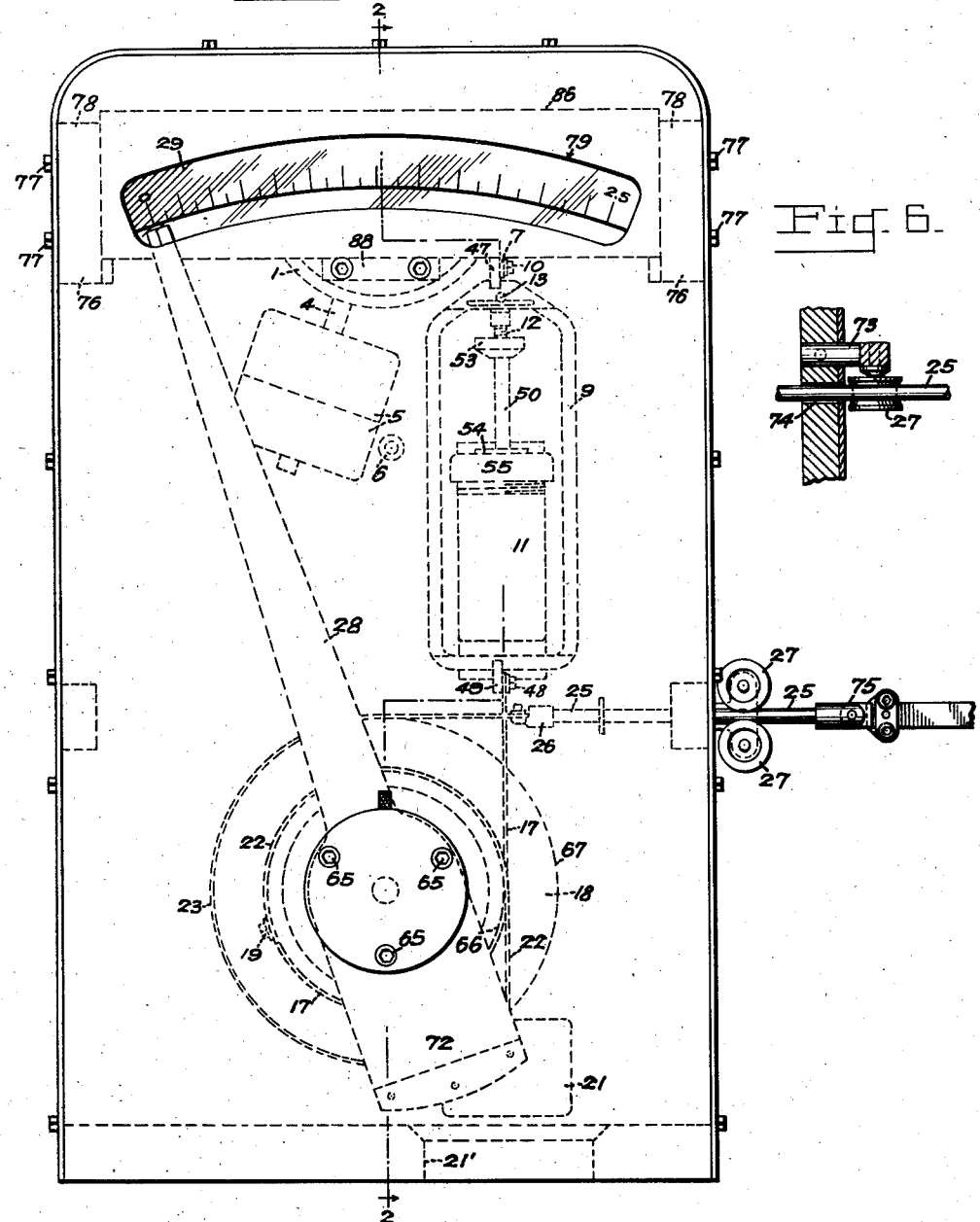
INVENTOR
Augusto De Rentiis July 20, 1943.  A. DE RENTIIS  2,324,497
FORCE MEASURING DEVICE
Filed Aug. 8, 1941  3 Sheets-Sheet 2
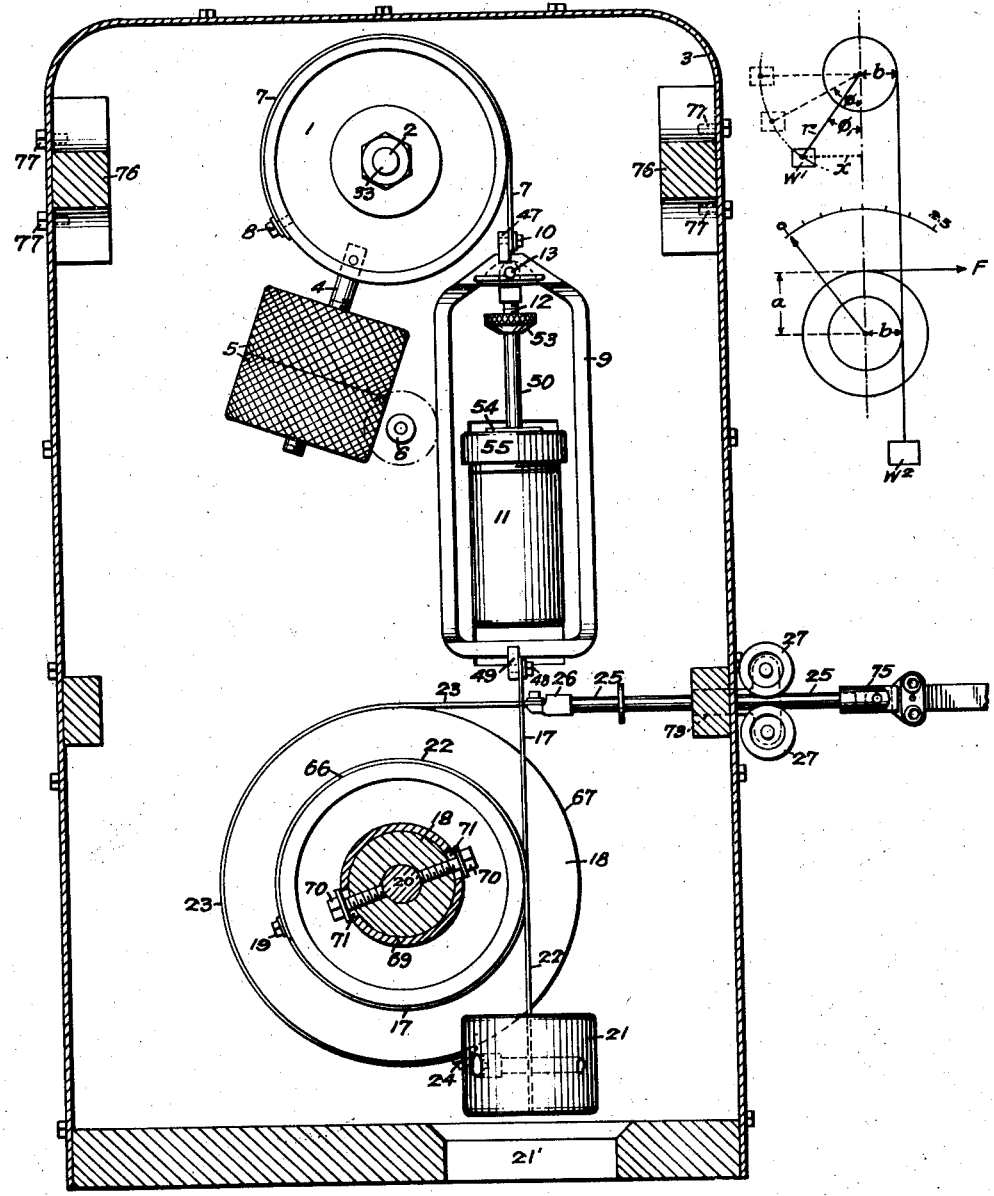
INVENTOR
Augusto De Rentiis
BY
ATTORNEYS July 20, 1943. A. DE RENTIIS 2,324,497
FORCE MEASURING DEVICE
Filed Aug. 8, 1941 3 Sheets-Sheet 3
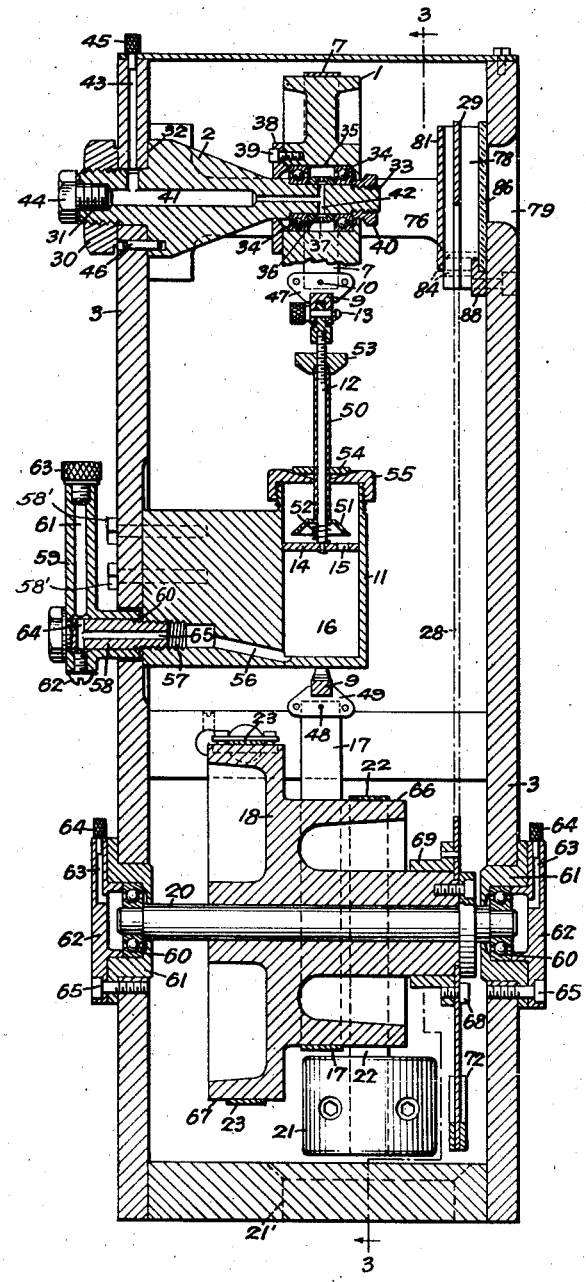
INVENTOR
Augusto De Rentiis
BY
ATTORNEYS Patented July 20, 1943

2,324,497

UNITED STATES PATENT OFFICE 2,324,497

FORCE MEASURING DEVICE

Augusto De Rentiis, Prospect Park, Pa.

Application August 8, 1941, Serial No. 405,960

3 Claims. (Cl. 265—62)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an automatic-indicating scale, and more particularly to a pendulum type scale for indicating torque.

An object of this invention is to provide an indicating scale which is free from backlash and other sources of inaccuracies.

Another object of the invention is to provide a force measuring scale having means for absorbing shock loads to which the device might be subjected.

A further object of the invention is to provide an accurate force measuring instrument which is simple in construction, inexpensive to manufacture, economical in upkeep, strong and durable.

The specific nature of the invention as well as other objects and advantages thereof will clearly appear from a description of a preferred embodiment as shown in the accompanying drawings in which:

Fig. 1 is a front elevational view of the scale,

Fig. 2 is a vertical longitudinal sectional view on the line 2—2 of Fig. 1,

Fig. 3 is a sectional view on the line 3—3 of Fig. 2 showing the general arrangement of parts, Fig. 4 is a perspective view of a support for the dial system, Fig. 5 is a central longitudinal sectional view of the yoke member showing its attaching links mounted thereon, Fig. 6 is a plan view with parts in section showing the mounting of one of the guide rollers for the connecting rod, and Fig. 7 is a moment diagram illustrating the manner in which an unknown force is measured.

Referring now to the drawings, a pulley 1 is journalled on a shaft 2 which is fixed to the frame 3 of the device, see Fig. 3. Rigidly attached to the lower periphery of the pulley 1 is a threaded stem 4 which sustains a pair of weights 5. Weights 5 are nut-like members which engage the threaded stem 4 and are adjustable thereon in a well-known manner whereby their distance from the periphery of pulley 1 may be varied. The weights 5 normally rest adjacent a rubber covered stop 6 which is secured to the frame.

A flexible metal band 7 is wrapped about the upper periphery of the pulley 1 and is secured thereto adjacent the stem 4 by fasteners 8. A yoke 9 is suspended from the free end of band 7 by a convenient fastener 10. Yoke 9 is a rigid rectangular shaped bar which envelopes a damping device or dashpot 11. Dashpot 11 is firmly secured to the frame 3 of the scale. A plunger rod 12 is pivotally connected to the yoke 9 by a pin 13 and carries at its lower end a piston or plunger disk 14 having an orifice 15 therein, see Fig. 2. Piston 14 is adapted to reciprocate in dashpot cylinder 16 in unison with the vertical movements of its interconnected yoke 9. Suitable dashpot oil fills the cylinder 16.

The lower end of yoke 9 is secured to a flexible metallic band 17 which is wrapped about the lower periphery of a stepped pulley 18 and is attached thereto by fasteners 19, see Figs. 2 and 3. Pulley 18 is supported by a shaft 20 which is journalled in the frame 3. A pair of segmental counterweights 21 are anchored to a metallic band 22 which is wrapped about the lower step of pulley 18 and secured thereto by the aforementioned fasteners 19. The counterweights 21 apply a clockwise moment to pulley 18 and transmit a similar moment of force to pulley 1 through the connecting band 17, yoke 9, and band 7. This so counterbalances the counterclockwise moment applied to pulley 1 by the weights 5 that the weights are at rest adjacent the stop 6. This maintains the stem 4 at an angle with the vertical through the axis of shaft 2. Stop 6 prevents any possibility of the stem 4 swinging to a vertical position. An aperture 21' is provided in the base of frame 3 and permits unobstructed downward movement of the counterweights 21.

A metallic band 23 is attached to the stepped pulley 18 by fasteners 24 and has its opposite end secured to a connecting rod 25 by a coupling 26, see Fig. 3. Connecting rod 25 projects through the casing 3 and slides through a pair of guide rollers 27. The external force or torque to be measured is coupled to the connecting rod 25 and applies a clockwise moment to pulley 1 through the pulley 18, band 17, yoke 9, and band 7. This moment is resisted by the counterclockwise moment exerted by the weights 5 on the stem 4.

An indicator 28 (see Figs. 1 and 2) is attached to the lower pulley 18 and is adapted to oscillate under a graduated dial 29 at the front of the frame 3 where torque readings may be observed.

Dashpot 11 absorbs shock loads which the instrument might be subjected to and also eliminates any whipping or backlash in the bands 7 and 17 in a manner which will be described in another part of the specification.

Shaft 2 is a hollow member secured to the back of frame 3 by a nut 30 which engages a threaded reduced portion 31 and draws an annular shoulder 32 against the frame. The inwardly projecting end 33 has fitted thereon a pair of bearing races 34. The outer portions of the races 34 are fitted into a bore 35 in the pulley 1. A spacer 36 having a pair of oppositely disposed ports 37 separates the two bearing races 34. A bearing retainer 38 is secured to the pulley 1 by a fastener 39, and a nut 40 retains the pulley and bearing assembly on the shaft 2. A bore 41 in shaft 2 communicates with a vertical bore 42 which is in alignment with the ports 37 in the spacer 36. A bore 43 in frame 3 communicates with the bore 41 in the shaft 2 and the two serve as a reservoir and oil feeder for the bearings 34. Bolt 44 seals the horizontal opening to the reservoir and closure 45 seals the top opening. A dowel 46 prevents shaft 2 from turning under all conditions. The above described assembly provides a well lubricated anti-friction bearing which is free from wear and resulting inaccuracies which would be detrimental in a precision instrument.

Yoke 9 is attached to band 7 by a fastener 10 which passes through the band and an aperture in a connecting plate or link 47 which is integral with the yoke. An accurate fit is made at this point so that no play or lost motion is present. Band 17 is similarly attached to the bottom of yoke 9 by a pin 48 which passes through apertures in the band and in connecting plate 49.

Plunger rod 12 is encompassed by a sleeve 50 which extends the greater part of the length of the rod and projects into the cylinder 16 of the dashpot 11. The lower end of sleeve 50 is held in contact with a concave plunger disk 51 by a coiled spring 52 which bears against the piston 14. Disk 51 is separated from piston 14 and the distance therebetween may be varied by the adjusting nut 53 on the top of the sleeve 50 which engages the threads on rod 12. Sleeve 50 slides through a fluidtight aperture 54 in the cap 55 on the dashpot.

Dashpot 11 is provided with a rearwardly extending bore 56 which opens into the bottom of cylinder 16. Bore 56 has an enlarged threaded portion 57 which receives a hollow threaded bolt 58 that fits into a hollow oil feeder 59. Bolts 58' clamp the dashpot 11 and the oil feeder 59 to the frame 3. A gasket 60 is preferably employed to prevent leakage. Oil feeder 59 has a vertical bore 61 which is sealed by a screw 62 and an oil cap 63. Communicating passages 64 and 65 in the hollow bolt 58 permit the flow of fluid from the oil feeder to the dashpot. By maintaining the fluid lever near the top of the oil feeder 59, proper fluid level may be maintained in the dashpot 11.

The shaft 20 which supports the lower pulley 18 is journaled in a pair of anti-friction bearings 60 which are held in cup-shaped bearing retainers 61. Oil cups 62 having filling ports 63 which receive closures 64 are secured to the bearing retainers by bolts 65. Suitable gaskets (not shown) may be employed to seal the joints.

Pulley 18 is keyed or press fitted to shaft 20 and has stepped faces or drums 66 and 67. Bands 17 and 22 are attached to the smaller drum 66 by the previously mentioned fasteners 19 whereas band 23 is attached by fasteners 24 to the larger drum 67. Indicator 28 is secured by fasteners 68 to a flanged collar 69 which is fitted on a hub of the lower pulley 18. Headed cap screws 70 (see Fig. 3) pass through enlarged apertures 71 in the collar 69 and permit a zero adjustment of the indicator 28 whereupon it may be clamped to the hub of the pulley 18. The indicator 28 is statically balanced about its axis of rotation by a weighted tail 72.

Connecting rod 25 which is coupled to the band 23 at 26 rides in guide rollers 27. Rollers 27 are provided with anti-friction bearings (not shown) and are supported by standards 73 adjacent the aperture 74 in the frame 3 (see Fig. 6). A coupling 75 on the external end of the connecting rod 25 is employed to connect the scale to an external force to be measured.

A pair of spaced supports or brackets 76 are attached to the frame 3 by suitable fasteners 77. The brackets 76 have front ends 78 which are positioned adjacent the ends of the observation slit 79 at the front portion of the frame 3, see Figs. 1, 2 and 4. Each bracket has a groove 80 which is conformed to receive an end of a background plate 81 in a sliding fit. Grooves 83 in the front ends 78 of the brackets are adapted to receive the dial 29 and it is secured thereto by fasteners 84 which are placed in bores 85 in the ends 78, see Figs. 2 and 4. A window 86 is inserted in grooves 87 in the bracket structure and is also held by a grooved support 88 attached to the front of the frame 3, see Figs. 1 and 2.

It is to be noted that couplings which are made by means of fasteners are machined with extreme accuracy and are tightened so that backlash at these points is eliminated thereby assisting in producing a precise instrument.

The adjustment and operation of the device is as follows: With the scale exactly level the weights 5 are rotated on stem 4 until they hang just free of the stop 6. The counterclockwise moment exerted by weights 5 about the shaft 2 is counterbalanced by a clockwise moment exerted by yoke 9, the dashpot system 11, counterweights 21 and their connecting bands 7, 17, and 22. The indicator 28 should coincide with the zero point on the dial 29 as shown in Fig. 1 since equilibrium has been established. A force applied to connecting rod 25 will move it to the right and rotate pulley 18 clockwise. Counterweight 21 sinks into aperture 21' and the movement of the pulley 18 pulls band 17 downward and depresses yoke 9 and the piston 14 in the dashpot cylinder 16. This in turn rotates pulley 1 clockwise and swings weights 5 through an arc the sine of which is proportional to the magnitude of the force exerted on the connecting rod 25. Each increment of angular displacement of the weights 5 from the initial position of equilibrium represents a corresponding increment of force being applied to the scale. As the force increases, weights 5 swing a correspondingly greater distance from the vertical and the resisting moment of force exerted by those weights reaches a maximum when the stem 4 becomes horizontal. The movement of the indicator 28 is directly proportional to that of rod 25 and such movement is transmitted to the weights 5 without any backlash. Equilibrium is quickly established and the indicator 28 will designate on dial 29 the magnitude of the force applied to the connecting rod 25.

Fig. 7 represents a moment diagram for the device. The indicator gives a reading on the dial which is proportional to the sine of the angle which the arm $r$ makes with a vertical drawn through the axis of rotation of the weights $W_1$.

This may be expressed mathematically as follows:

$x = r \sin \phi_1$ $w_1 x = w_2 b$ where $F = 0$ $w_1 r \sin \phi = Fa + w_2 b$ for the condition of equilibrium when an unknown force F is being measured since $w_1$, $a$, $r$, and $w_2 b$ are constants, $a$ being the radius of the larger drum 67, $r$ constituting the distance along stem 4 from the axis of shaft 2 to the center of mass of weight 5, and $b$ representing the radius of the smaller drum 66 of the pulley 18.

$F \backsimeq \sin \phi$

It is preferable that the weight $w_1$ be disposed at an angle of at least 19° with the vertical drawn through its axis of rotation when the dial reads zero. This is accomplished by employing the counterweight $w_2$. Below 18° the sine of that angle is less than .3 and the larger the angle utilized, the more accurate will be the machine especially when $w_1$, $r$, and $a$ are purposely kept small to measure more delicate forces.

Dial 29 may be calibrated to indicate force, weight, or torque. As shown in Fig. 1 this dial is graduated to read inch-pounds of torque.

The dashpot serves an important function in absorbing shock loads which might be applied to the scale, thus preventing injury to the working mechanism. It also aids in establishing equilibrium by its damping action on indicator fluctuations when a force is applied to the connecting rod. When a force is applied to the connecting rod 25 the piston 14 is depressed in cylinder 16. Oil flows upward through the orifice 15 into the top of the cylinder. The rate of flow may be controlled by regulating the distance disk 51 is separated from piston 14 by turning the adjusting nut 53. The flow of dashpot oil is restricted as disk 51 approaches piston 14. By the well known principle of the fluid brake, the dashpot suppresses undesirable fluctuations in the moving system of the scale and prevents sudden peak loads from damaging the movable elements.

Since the bands 7, 17, and 23 constitute the only flexible members in the moving system, the dashpot eliminates any whipping or flapping of those members when a sudden or jerking load is applied to the connecting rod 25. This means the moving system acts as though it were one rigid member. The instant scale is thereby superior to those employing knife edges, links, gears, and unbalanced masses since inaccuracies due to backlash and inertia are effectively overcome.

Anti-friction bearings and means for providing adequate lubrication at all times causes friction in the moving parts of the scale to be a negligible factor in its operation and accuracy.

I claim:

1. In a force measuring device, a frame, a pulley concentrically mounted on a horizontal shaft on the frame, a weight eccentrically mounted on the pulley and swung upward against the force of gravity by a force rotating the pulley in clockwise direction, a flexible band secured at one end to said pulley and wrapped about its periphery, a two diameter pulley below the first and similarly mounted in the frame, a second flexible band connected at one end to the smaller diameter part of the lower pulley and at the other to the first mentioned band, a flexible band secured at one end to the larger diameter part of the lower pulley and at the other to a device the force of which is to be measured, a scale on the frame and an indicator secured to the lower pulley for movement relative to the scale when the lower pulley is rotated.

2. In a force measuring device, a frame, a pulley concentrically mounted on a horizontal shaft in the frame, a weight eccentrically mounted on the pulley and swung upward against the force of gravity by a force rotating the pulley in clockwise direction, a flexible band secured at one end to said pulley and wrapped about its periphery, and connected at its other end to a damping device, a two diameter pulley below the first and similarly mounted in the frame, a second flexible band connected at one end to the smaller diameter of the lower pulley and at the other to said damping device, a flexible band secured at one end to the larger diameter part of the lower pulley and at the other to a device the force of which is to be measured, a scale on the frame and an indicator secured to the lower pulley for movement relative to the scale to show the magnitude of the force.

3. In a force measuring device, a frame, a pulley concentrically mounted on a horizontal shaft in the frame, a weight eccentrically mounted on the pulley and swung upward against the force of gravity by a force rotating the pulley in clockwise direction a flexible band secured at one end of the pulley and wrapped about its periphery, and connected at its other end to a damping device, a two diameter pulley below the first and similarly mounted in the frame, a second flexible band connected intermediate its ends to the smaller diameter part of the lower pulley and wrapped completely around the periphery thereof, and at its upper end to the damping device, the lower end of said band after encircling the pulley being connected with a counterweight, a third flexible band connected at one end to the larger diameter part of the pulley and wrapped about its periphery, and having its other end connected to a device the force of which is to be measured, a scale on the frame, and an indicator secured to the lower pulley for movement relative to the scale, when the lower pulley is rotated.

AUGUSTO DE RENTIIS.